Oct. 8, 1935. H. T. THOMAS ET AL 2,016,350
TRANSMISSION MECHANISM
Filed Sept. 18, 1933 3 Sheets-Sheet 2

INVENTORS
Horace T. Thomas
Albert B. Hays
BY Whittemore Hulbert
Whittemore & Belknap
ATTORNEYS

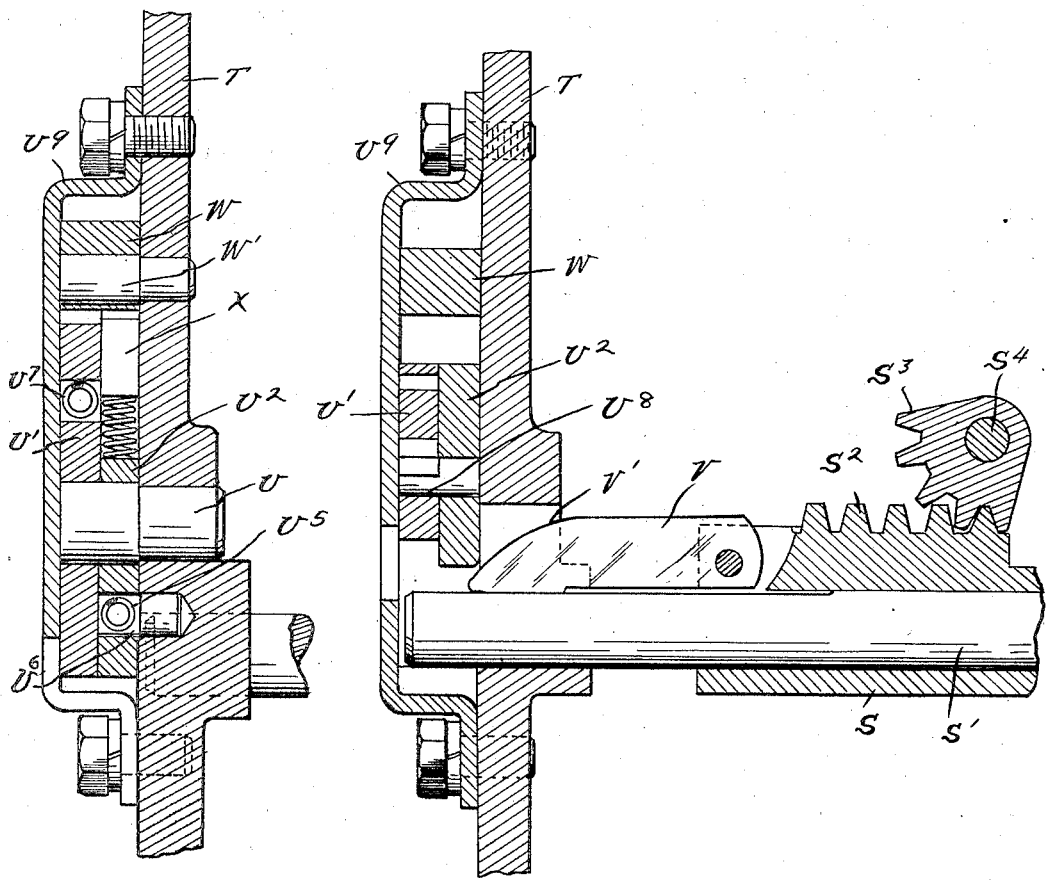

Patented Oct. 8, 1935

2,016,350

UNITED STATES PATENT OFFICE 2,016,350

TRANSMISSION MECHANISM

Horace T. Thomas and Albert B. Hays, Lansing, Mich., assignors to Reo Motor Car Company, a corporation of Michigan Application September 18, 1933, Serial No. 689,986

9 Claims. (Cl. 74—260)

The invention relates to transmission mechanisms more particularly designed for use on motor vehicles and of the semi-automatic type in which changes in load or speed of the driven member will affect a change in ratio of the gearing. With transmissions of this character such for instance as shown in the application for patent by Horace T. Thomas and John Bethune, Serial No. 592,580, filed February 12, 1932, the automatic change in ratio only takes place when the vehicle is traveling in a forward direction. When the transmission is in reverse, the gear ratio remains constant, and to accomplish this it is also necessary to lock one member of the automatic transmission.

It is the object of the present invention to obtain a construction of transmission in which the automatic change in ratio responsive to variations in load or speed of the driven member, will take place during reverse as well as during forward drive. To this end the invention consists in the construction as hereinafter set forth. The automatic transmission to which my improvements are applied is of the planetary type, the intermediate member of which is normally held from reverse rotation. The change in ratio is accomplished by a friction clutch between this intermediate member and the driven member, together with means for increasing the friction upon this clutch in proportion to speed of the driven member. Thus the intermediate member while locked against reverse rotation must be free to rotate in the same direction as the driven member, but at a varying speed, according to the friction applied to the clutch. Obviously this mechanism would not be operative in reverse, as the intermediate member being free would revolve without transmitting torque to the driven member. Therefore as above stated, it is necessary to lock the intermediate member from such reverse rotation when the transmission is in reverse. This I have accomplished, first, by the use of a reversible one-way clutch and second, by automatically effecting reversal of said clutch by the manual control for the reverse drive.

The detailed construction of the semi-automatic transmission to which my improvements are applied is not essential to the present invention, and I shall therefore illustrate and describe this only in a general way.

Figure 2:
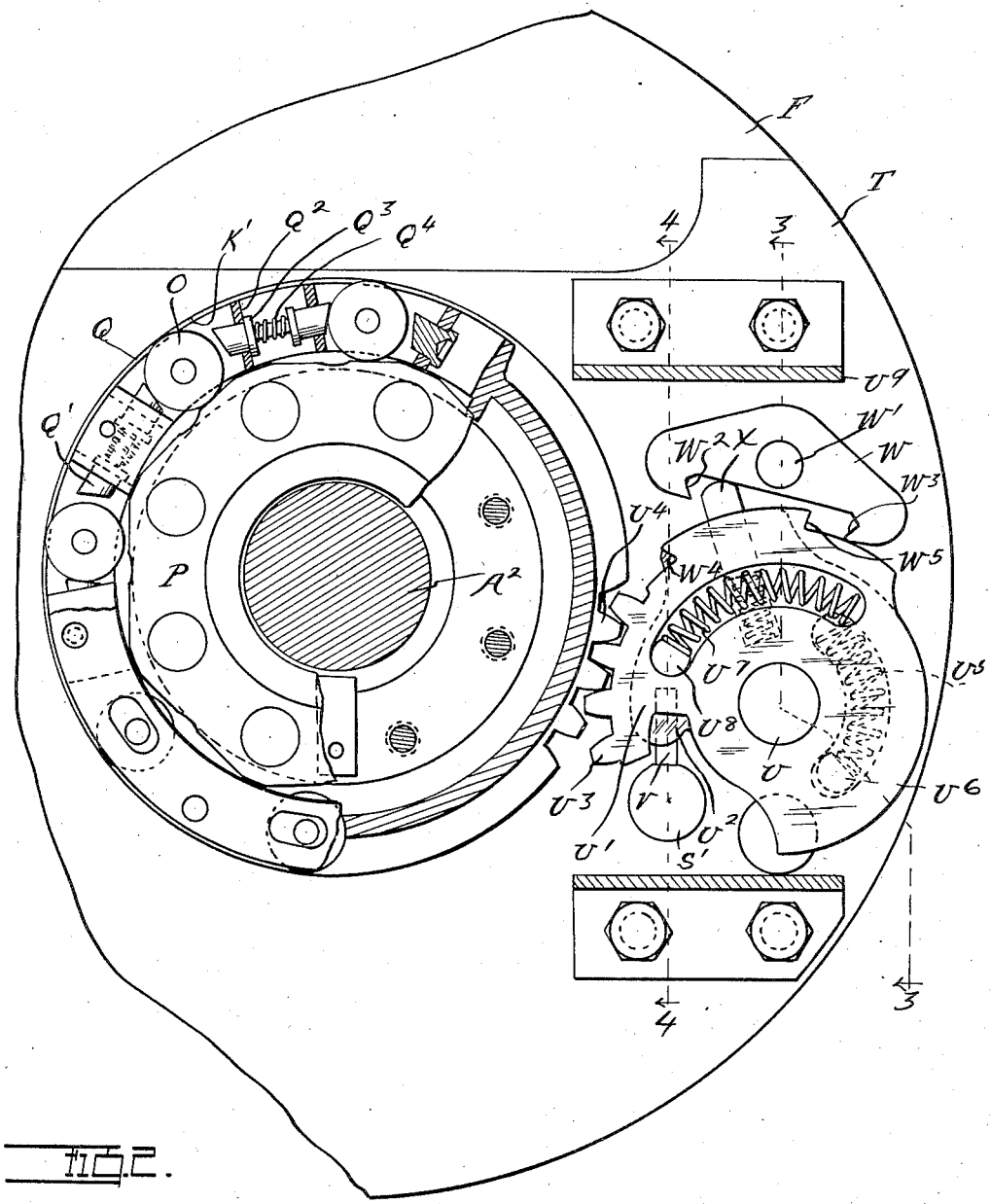
Fig. 2 is a transverse section substantially on lines 2—2 of Fig. 1.

Figs. 3 and 4 are sections respectively on lines 3—3 and 4—4 of Fig. 2.

Figure 1:
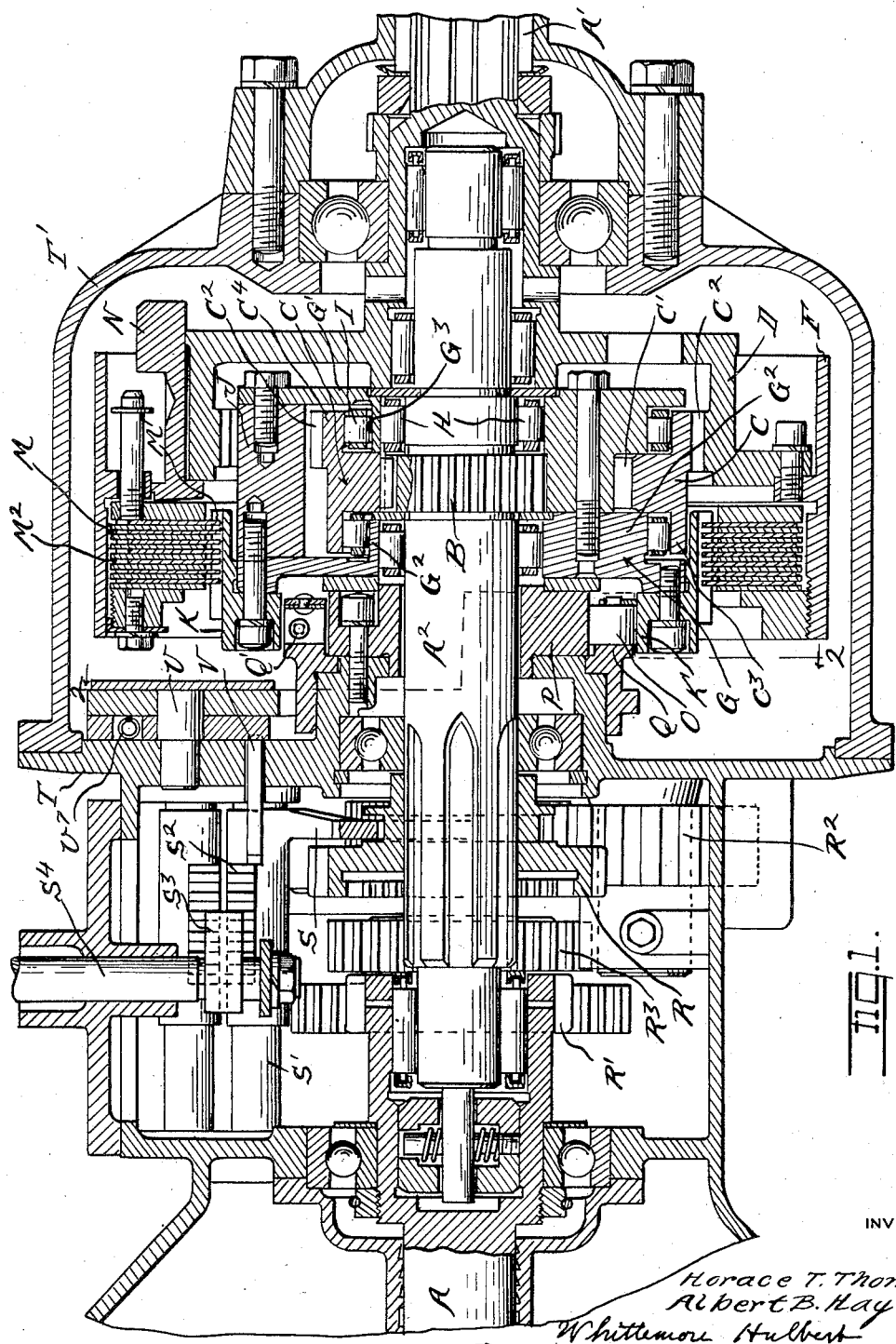
Fig. 1 is a horizontal section through the transmission mechanism.

As shown in Fig. 1, A is the drive shaft, A' a driven shaft, and $A^2$ is an intermediate shaft, all in axial alignment. B is a sun gear mounted on the intermediate shaft $A^2$, C is a ring gear which is eccentric in relation to the axis of said shafts and which has internal gear teeth C' in mesh with the gear B and external gear teeth $C^2$. D is a revoluble internal gear concentric with the axis of the shaft A and in mesh with the external gear teeth $C^2$ of the ring gear C. The gear D is directly connected to the driven shaft A' and it also has connected thereto a drum F enclosing a friction disk clutch which will be later described.

To retain the ring gear C in its eccentric relation to the axis of the shaft A, it is mounted upon a gear carrier which in turn is mounted to be revoluble concentric to the axis thereof. This gear carrier G is in the form of a cage comprising side plates G' on opposite sides of the ring gear C and which are provided with cylindrical race members $G^2$ concentric with the axis of the shaft A and supported on said shaft through the medium of roller bearings H. The plates G' are also provided with eccentric race members $G^3$ for cooperating with rollers I which engage cylindrical flange $C^3$ and $C^4$ on the ring gear C. The plates G' are cross-connected by members J so fashioned as to avoid interference with the ring gear C.

With the construction as thus far described, it will be understood that the cage G forms an eccentric bearing for the ring gear C but is itself revoluble concentric to the axis of the shaft A. As the ring gear is an intermediate between the sun gear B and the internal gear D it is obvious that when the gear B is rotated in a direction to drive the vehicle forward, it will transmit motion in the same direction but at a lower speed to the internal gear D. However, to perform this function the carrier G and ring gear C must be held from reverse rotation in order to receive the reaction of the load. When thus held, movement will be transmitted through the planetary gearing to drive the driven member at lower speed and with greater power.

To automatically change the ratio between the drive and driven member, a friction slip clutch M is arranged within the drum F. This clutch has its alternate plates M', $M^2$ respectively connected with said drum and with a member K upon the cage G. Weighted levers N are arranged within the drum and are centrifugally actuated to apply pressure to the plates M', M² with the result that as the speed of the driven member increases the friction of the clutch will be correspondingly increased. This will apply a torque to the carrier G which is resisted by the reaction of the planetary gears, but which when sufficient to balance the load will drive all of the planetary members as a unit and at the same angular speed as the shaft A². In other words, where the driven member is rotating at slow speed or under heavy load, all of the power will be transmitted at low ratio through the planetary gearing, but as the speed of the driven member is increased or the load is diminished, the intermediate or cage member G will be gradually accelerated to change the gear ratio, eventually rotating at the same speed as the driven member.

The means employed for holding the carrier G from reverse rotation is a clutch having rollers O arranged between an annular race K' on the member K and a polygonal member P which is normally nonrevoluble. The construction is such that when the rolls are in a central position with respect to the polygonal faces, they will permit free rotation of the member K, but when moved on one side of the center will wedge, locking the member K against rotation. The rolls O are held in a cage or retainer Q provided with peripheral pockets for receiving each roll and with spring pressed stop pins Q' on opposite sides of each pocket. These stop pins engage apertures in cross partitions Q² in the cage having heads Q³ for limiting movement toward the rollers and with springs Q⁴ between said heads. Thus when the cage is properly positioned with respect to the polygonal member P the rolls O will prevent any rotation of the carrier G in a direction reverse to the forward rotation of the driven member.

As previously described, the automatic gearing is arranged between the intermediate shaft A² and a driven shaft A'. I have, however, provided a manually controlled gearing which is arranged between the drive shaft A and the intermediate shaft A². The detailed construction of this manually controlled gearing is not essential, but it includes a plurality of forward speeds and a reverse drive. As shown, R is a shiftable gear having a splined engagement with the intermediate shaft A² which when shifted to the left, Fig. 1, will have a direct clutching engagement with a gear wheel R' on the drive shaft A, when shifted to the right will be engaged with a reversing gear R², and when shifted to an intermediate position will engage with a gear wheel R³ through which the shaft A² will be driven in a forward direction at a slow speed. The gear wheel R is actuated by a shifter fork S which slidably engages a guide rod S' and is itself actuated by a shifter lever through the medium of a rack S² on the fork in mesh with a segmental rack S³ on a rock shaft S⁴. It will be understood that the transmission includes other elements not specifically shown or described which are usually employed in a two-speed forward and reverse transmission. It is believed unnecessary to describe these, as they are not essential to an understanding of the present invention.

To affect the reversal of the one way clutch it is only necessary to rotate the cage or retainer Q so as to shift the rollers O from one side of the center of the polygonal faces P to the opposite side thereof. This is accomplished by mechanism of the following construction. T is a partition which separates the automatic transmission from the manually controlled transmission and which forms a part of an enclosing housing T'. U is a stud projecting from this partition and having pivotally mounted thereon the adjacent disk shaped members U' and U². The member U' has a gear segment U³ thereon which is in mesh with the gear segment U⁴ on the cage or retainer member Q. U⁵ is a spring arranged in a segmental slot in the member U², one end abutting against a pin U⁶ projecting from the partition T. U⁷ is a spring in a segmental slot within the member U', one end of which abuts against a pin U⁸ projecting from the member U². V is a tongue member attached to the shifter S and slidably bearing upon the guide rod S' which latter projects through the partition T adjacent to the members U' and U². This tongue V has a cam face V' which when the shifter S is moved to reverse position will engage a bearing on the member U² to rotate the latter about the axis of the stud U. This through the medium of the pin U⁸ and spring U⁷ will communicate a similar movement to the member U' which through the intermeshing gear segments U³ and U⁴ will rotate the cage member Q to reverse the action of the one-way clutch. On the other hand, when the shifter S is moved from reverse position to forward drive position, the withdrawal of the tongue V will permit the member U² to be returned under the actuation of the spring U⁵, thereby returning the one-way clutch to its original position. A strap U⁹ secured to the partition T serves to hold the members U' and U² upon the stud U.

To prevent any possible accidental changing of the clutch, I have provided a locking dog W pivotally mounted on a stud W' and having the oppositely facing shoulders W² and W³ for engaging shoulders W⁴ and W⁵ on the member U'. The dog W' is actuated by a spring pressed pin X which is mounted on the member U² to bear against the member W, being so positioned that during the rotative adjustment of said member it will bear on the member W alternately upon opposite sides of the stud W'. Thus the member U' will be initially locked from adjustment while the member U² is rotated by the cam V'. However, as soon as the latter member has completed its rotative adjustment, the transfer of the spring pin S to the opposite side of the dog W' will disengage the lock and permit the member U' to rotate under the resilient pressure of the spring U⁷. This will also engage the opposite end of the locking dog with the shoulder on the member U' so as to again lock this member from movement until another actuation of the member U² has been affected.

*Operation*

With the construction as above described, whenever the manually controlled transmission is in forward driving position either at low or high speed, the shifter S will be in a position to withdraw the tongue V from engagement with the member U². Consequently the spring U⁵ will hold said member in a position where the one-way clutch holds the carrier G from reverse rotation, although permitting forward rotation when actuated by the clutch M. On the other hand, when the manually controlled gear shift is adjusted to reverse position, the shifter S will force the tongue V into engagement with the member U², causing the cam V' to rotate said member against the tension of the spring U⁵. This by movement of the pin U⁸ will place a tension on the spring U⁷ and at the same time the movement of the spring pressed pin X to the opposite side of the stud W' will rock the locking dog W so as to disengage the shoulder W³ from the shoulder W⁵. When thus disengaged, the member U' will be rotated by the tension of the spring U⁷ and through the intermeshing gears U³ and U⁴ will rotate the cage member Q. This shifts the rollers to the left, Fig. 2, and to the opposite side of the center of the polygonal faces on the member P, the effect of which is to lock the cage member G from rotation in a forward direction while permitting it to rotate in reverse direction under the actuation of a clutch M. It is thus obvious that the automatic variable speed transmission can function during the reverse drive in the same manner that it functions during forward drive to vary the gear ratio according to load and speed of the driven member.

What we claim as our invention is:

1. In a transmission gearing, the combination with a drive member, a driven member and an intermediate member, of reversing mechanism between said drive member and intermediate member, an automatic variable speed transmission between said intermediate member and driven member controlled in its operation by load and speed of the driven member, said automatic transmission including a member under stress to be revolved in reverse direction from said driven member, and a one way clutch for holding said member from such reverse movement while permitting forward movement, and means actuated by the reversing mechanism between said drive member and intermediate member for reversing the action of said one-way clutch.

2. In a transmission gearing, the combination with a drive member, a driven member and an intermediate member, of reversing mechanism between said drive member and intermediate member, a planetary variable speed transmission mechanism between said intermediate member and driven member including a member under stress to be revolved in a direction reverse from the driven member, a friction clutch for coupling said member to said driven member and centrifugally operated means controlled by the speed of the driven member for varying the friction of said clutch, a one-way clutch for holding said member under reverse stress from reverse movement and means actuated by said reversing mechanism between said drive member and intermediate member for reversing the action of said one-way clutch.

3. In a transmission gearing, the combination with a drive member, a driven member and an intermediate member, of reversing mechanism between said drive member and intermediate member, a variable speed planetary transmission between said intermediate member and driven member including a planetary gear carrier under stress to be revolved in reverse direction from said driven member, a friction clutch for coupling said carrier with said driven member, means controlled by the speed of the driven member for varying the friction of said clutch, a one-way clutch for holding said carrier from reverse movement while permitting forward movement thereof, and means actuated by the reversing mechanism between said drive member and intemediate member for reversing the action of said one-way clutch.

4. In a transmission gearing, the combination with a drive member, a driven member and an intermediate member, of reversing mechanism between said drive member and intermediate member, a variable speed planetary transmission between said intermediate member and driven member including a planetary gear carrier under stress to be revolved in reverse direction from said driven member, a friction clutch between said carrier and driven member, means controlled by the speed of the driven member for varying the friction of said clutch, a reversible one-way clutch for holding said carrier against movement in the direction in which it is stressed, and means actuated by the reversing mechanism between said drive member and intermediate member for reversing the action of said one-way clutch.

5. In a transmission gearing, the combination with a drive member, a driven member and an intermediate member, of reversing mechanism between said drive member and intermediate member, a variable speed planetary transmission between said intermediate member and driven member including a gear carrier under stress to be revolved in reverse direction from said driven member, a reversible one-way clutch for holding said carrier from rotation in the direction in which it is stressed while permitting rotation in the opposite direction, said clutch comprising a stationary polygonal member, a surrounding annular race movable with said carrier, rollers intermediate said polygonal member and said race member, and a cage for retaining said rollers, and means actuated by the reversing mechanism between said drive member and intermediate member for rotating said cage to reverse the action of said one-way clutch.

6. In a transmission gearing, the combination with a drive member, a driven member and an intermediate member, of reversing mechanism between said drive member and intermediate member, a variable speed planetary transmission between said intermediate member and driven member including a planetary gear carrier under stress to be revolved in reverse direction from said driven member, a friction clutch between said gear carrier and driven member, means controlled by the speed of the driven member for varying the friction of said clutch, a reversible one-way clutch for holding said gear carrier from rotation in the direction in which it is stressed while permitting free rotation in the opposite direction, said reversible clutch comprising a polygonal stationary member, an annular race member movable with said carrier, rollers intermediate said race member and polygonal member and a cage for retaining said rollers, a gear shifter for the reversing mechanism between said drive member and an intermediate member, means actuated by said gear shifter for rotating said cage to reverse the operation of said one-way clutch and a safety lock also actuated by said shifter for holding said cage in the position to which it is adjusted.

7. In a transmission gearing, the combination with a drive member, a driven member and an intermediate member, of reversing mechanism between said drive member and said intermediate member, a variable speed planetary transmission between said intermediate member and driven member including a planetary gear carrier under stress to be revolved in reverse direction from said driven member, a friction clutch between said gear carrier and driven member, means controlled by the speed of the driven member for varying friction of said clutch, a reversible one-way clutch for holding said gear carrier from rotation in the direction in which it is stressed while permitting free rotation in the opposite direction, said reversible clutch comprising a polygonal stationary member, an annular race member movable with said carrier, rollers intermediate said race member and polygonal member, and a cage for retaining said rollers, a gear shift for the reversing mechanism between said drive member and intermediate member, means actuated by said gear shift for resiliently rotatively stressing said cage, a safety lock for holding said cage from rotation during the initial movement of said shifter and means actuated by the completion of movement of said shifter for releasing said safety lock to permit the rotative shifting of said cage.

8. In a transmission gearing, the combination with a drive member, a driven member and an intermediate member, of a reversing mechanism between said driven member and intermediate member, automatic variable speed transmission between said intermediate member and driven member including a member under stress to be revolved in reverse direction from said driven member, a reversible one-way clutch for holding said last mentioned member from rotation in the direction stressed, said reversible clutch comprising a polygonal stationary member, an annular race member, rollers intermediate said race member and polygonal member, and a cage for retaining said rollers, a gear shifter for the reversing mechanism between said drive member and intermediate member, a pair of coaxial oscillatory members, one of which is oscillated by the movement of said gear shifter, and the other connected to rotate said cage, a resilient coupling between said oscillatory members, a safety lock for holding the oscillatory member connected to said cage from movement during the initial movement of said shifter, and means actuated by the completion of movement of said shifter for releasing said safety lock to permit rotation of said cage by said resilient coupling means.

9. In a transmission gearing, the combination with a drive member, a driven member and an intermediate member, of reversing mechanism between said drive member and intermediate member, an automatic variable speed transmission between said intermediate member and driven member controlled in its operation by load and speed of the driven member, said automatic transmission including a member under stress to be revolved in reverse direction from said driven member, means for holding said member against rotation in the direction in which it is normally stressed while permitting movement in the opposite direction and means actuated by the reversing mechanism between said drive member and intermediate member for holding said member from rotation in the direction normally permitted.

HORACE T. THOMAS.
ALBERT B. HAYS.